(12) United States Patent
Yamaguchi

(10) Patent No.: US 8,510,022 B2
(45) Date of Patent: Aug. 13, 2013

(54) ECO-RUN CONTROL DEVICE AND ECO-RUN CONTROL METHOD

(75) Inventor: Kazuhi Yamaguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 414 days.

(21) Appl. No.: 12/817,603

(22) Filed: Jun. 17, 2010

(65) Prior Publication Data

US 2011/0004396 A1 Jan. 6, 2011

(30) Foreign Application Priority Data

Jul. 1, 2009 (JP) .................................. 2009-157136

(51) Int. Cl.
*G06F 19/00* (2011.01)

(52) U.S. Cl.
USPC ........................................ 701/112; 123/179.3

(58) Field of Classification Search
USPC .................... 701/112, 113; 123/179.3, 179.4
See application file for complete search history.

(56) References Cited

U.S. PATENT DOCUMENTS

| 7,860,636 | B2 * | 12/2010 | Yamaguchi | 701/112 |
| 7,860,637 | B2 * | 12/2010 | Yamaguchi | 701/112 |
| 8,311,725 | B2 * | 11/2012 | Yamaguchi | 701/112 |

FOREIGN PATENT DOCUMENTS

| EP | 1 882 849 A1 | 1/2008 |
| JP | A-2002-202001 | 7/2002 |
| JP | A 2003-148313 | 5/2003 |
| JP | A 2003-247478 | 9/2003 |
| JP | A 2004-278541 | 10/2004 |
| JP | A 2005-090301 | 4/2005 |
| JP | A-2005-307851 | 11/2005 |
| JP | A 2006-322332 | 11/2006 |
| JP | A 2007-046546 | 2/2007 |
| JP | A 2008-151041 | 7/2008 |
| WO | WO 2006/123654 A1 | 11/2006 |

OTHER PUBLICATIONS

Mar. 5, 2013 Office Action issued in Japanese Patent Application No. 2009-157136, w/translation.

* cited by examiner

*Primary Examiner* — John Kwon
(74) *Attorney, Agent, or Firm* — Oliff & Berridge, PLC

(57) ABSTRACT

An eco-run control device is provided. A control unit is configured to perform an eco-run control of stopping an engine on the basis of stop conditions and of restarting the engine on the basis of restart conditions. A starter driving unit is configured to drive a starter for restarting the engine. A test unit is configured to perform a failure test of the starter driving unit to determine whether the starter driving unit is out of order before the control unit stops the engine by the eco-run control. A nullifying unit is configured to nullify the failure test by the test unit when it is detected that a power supply voltage supplied to the starter driving unit drops below a predetermined value. A prohibiting unit is configured to prohibit the control unit from performing the eco-run control when the test unit determines that the starter driving unit is out of order. The prohibiting unit prohibits the control unit from performing the eco-run control in a case where the nullifying unit nullifies the failure test by the test unit during a test period in which the test unit performs the failure test.

2 Claims, 13 Drawing Sheets

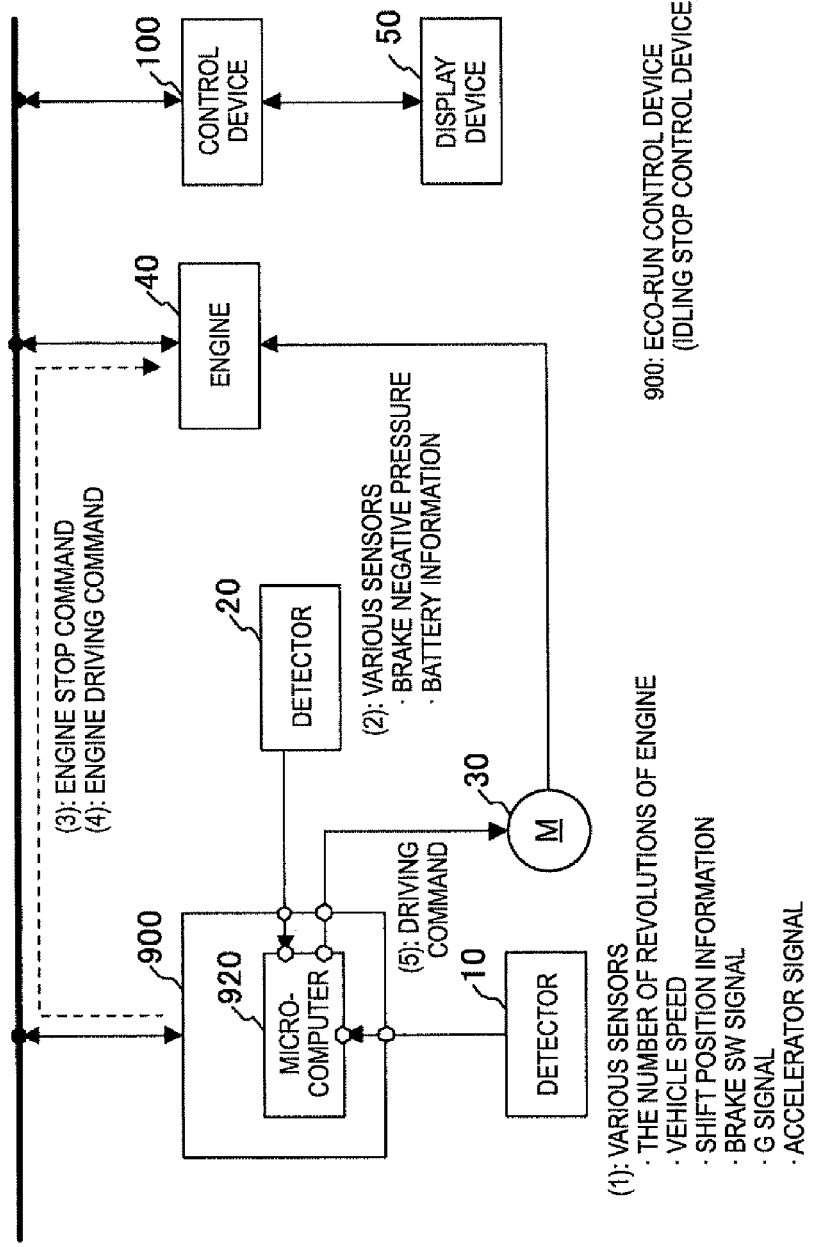

930: VOLTAGE LOWER CONTROL CIRCUIT

930: VOLTAGE LOWER CONTROL CIRCUIT

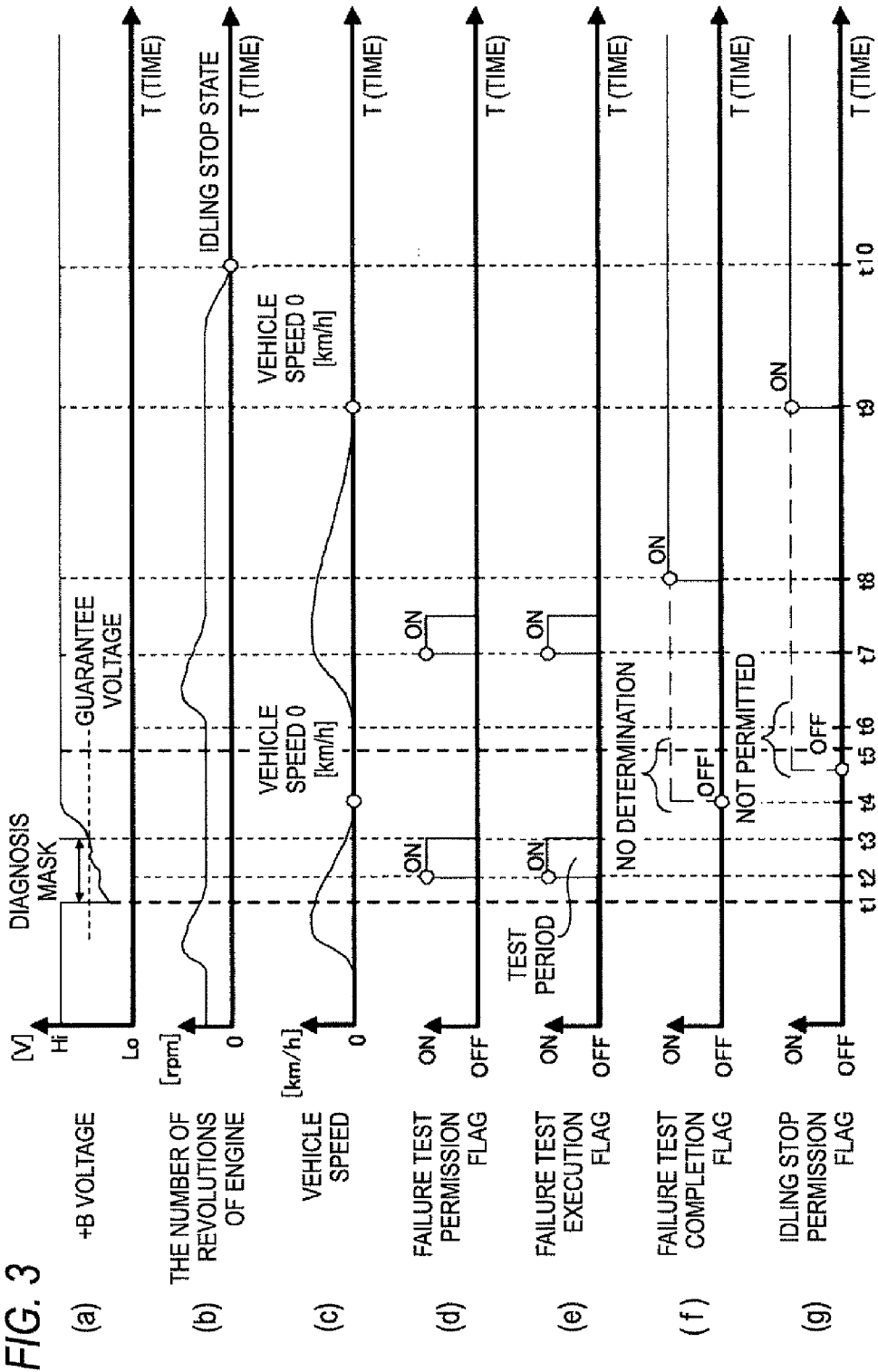

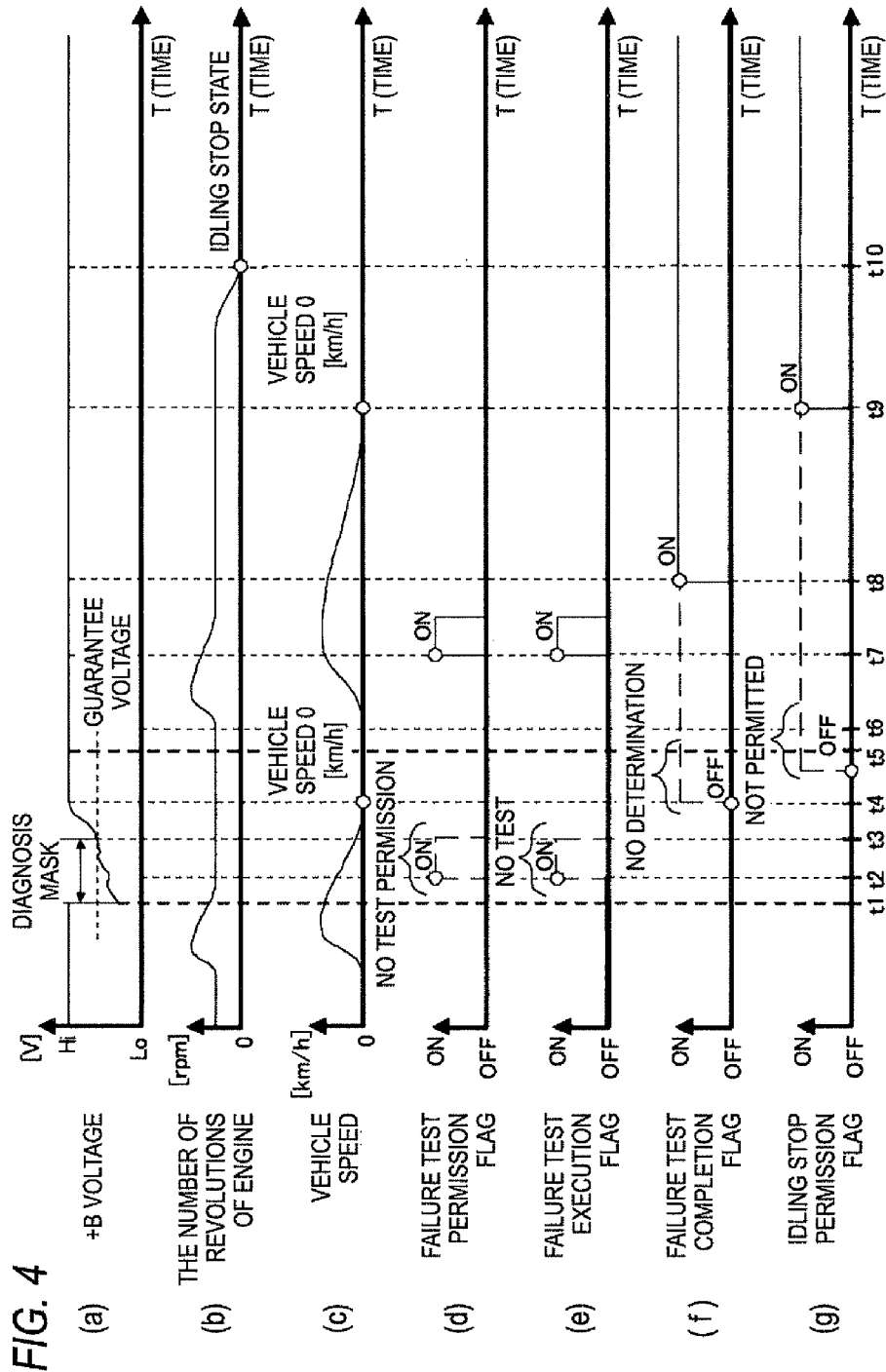

923g: PROHIBITION SECTION

ECO-RUN CONTROL DEVICE AND ECO-RUN CONTROL METHOD

The disclosure of Japanese Patent Application No. 2009-157136 filed on Jul. 1, 2009 including specification, drawings and claims is incorporated herein by reference in its entirety.

BACKGROUND

The present invention relates to an eco-run control device and an eco-run control method for controlling a vehicle to perform eco-run.

In recent years, a vehicle performs eco-driving (hereinafter, also referred to as eco-run) including automatic stopping of the engine (for example, idling stop) in order to improve the gas mileage of the vehicle and to suppress exhaust gas emissions.

In this specification, it is assumed that "eco" means at least one of "economy" and "ecology". Economy means fuel savings (reduction in fuel consumption) by suppressing fuel consumption. Ecology means suppressing fossil fuel consumption or suppressing the generation or emissions of harmful substances or carbon dioxide caused by combustion of fossil fuels.

A vehicle which performs eco-run includes a detector which detects a state of the vehicle, and a control device which performs eco-run control on the basis of the state detected by the detector. The eco-run control refers to a control of automatically stopping the engine when it is determined that the predetermined stop conditions are satisfied on the basis of the vehicle state detected by the detector and of automatically starting the engine when it is determined that the predetermined restart conditions are satisfied on the basis of the vehicle state detected by the detector.

In order to prevent being unable to restart the engine after stopping the engine by eco-run control, Patent Document 1 discloses a failure detection method for detecting the failure of a starter driving circuit which restarts the engine.

In this failure detection method, failure of the starter driving circuit is detected before automatically stopping the engine by eco-run control by setting the failure detection timing of the starter driving circuit as a time when the engine stop conditions are satisfied. Moreover, in this failure detection method, stopping of the engine by eco-run control is prohibited by prohibiting the execution of the eco-run control when the failure is detected.

Patent Document 2 discloses a control device which performs the eco-run control and which is capable of preventing erroneous detection in a failure test of a starter driving circuit.

This control device executes mask processing of masking the detected failure for a failure test result when performing a failure test for the starter driving circuit, which restarts the engine, in a predetermined period for which a voltage drop caused by a restart occurs after restarting the engine.

Patent Document 3 discloses a control apparatus having an automatic engine stop function and an abnormal diagnosis function. This control device can stop an engine automatically when a predetermined automatic stop conditions are satisfied and can execute a self-abnormal diagnosis. In order to frequently execute the abnormal diagnosis, the control device prohibits execution of the automatic engine stop if the control device has not yet executed the abnormal diagnosis to be executed, even when the automatic stop conditions are satisfied.

Patent Document 1: JP-A-2006-322332
Patent Document 2: JP-A-2007-46546
Patent Document 3: JP-A-2008-151041

In the failure diagnosis method disclosed in Patent Document 1, however, there is a problem that a microcomputer erroneously detected the failure of a starter driving circuit when the voltage state of the microcomputer is different from the voltage state of the starter driving circuit. Specifically, there is a problem that the microcomputer erroneously detects the failure of the starter driving circuit when a voltage applied to the starter driving circuit drops in a period for which the microcomputer tests the failure of the starter driving circuit.

As a specific example, as shown in FIG. 2A, the case where a microcomputer 920 and a starter driving circuit 910 operate using the same +B power source and the microcomputer 920 can operate using a lower voltage than for the starter driving circuit 910 will be described. In this case, there is a problem that if the voltage of the +B power source drops so that the starter driving circuit 910 can not operate although the microcomputer 920 could operate, the microcomputer 920 erroneously detects that the starter driving circuit 910 fails even though the starter driving circuit 910 does not actually fail.

Similarly, as a specific example, if only the voltage applied to the starter driving circuit 910 drops when the microcomputer 920 and the starter driving circuit 910 operate using different power sources as shown in FIG. 2B, there is a problem that the microcomputer 920 erroneously detects the failure of the starter driving circuit 910.

Moreover, in the control device disclosed in Patent Document 2 for solving these problems, the failure is masked from the test result of the starter driving circuit 910 over a predetermined time after restarting the engine. For this reason, in the control device disclosed in Patent Document 2, there is a problem that the execution of eco-run control is permitted even when the failure actually occurred.

Patent Document 3 takes exhaust gas sensors, a catalyst, a fuel system and an ignition system for example of components or systems to be diagnosed. However, Patent Document 3 does not discloses testing a starter driving circuit. In addition, there is no mention of erroneous failure detection due to the voltage reduction.

SUMMARY

It is therefore an object of at least one embodiment of the present invention to provide an eco-run control device and an eco-run control method capable of preventing the execution of eco-run control using a starter driving means which is out of order even at the time of voltage reduction.

In order to achieve the above described object, according to an aspect of at least one embodiment of the present invention, there is provided an eco-run control device, comprising: a control unit configured to perform an eco-run control of stopping an engine on the basis of stop conditions and of restarting the engine on the basis of restart conditions; a starter driving unit configured to drive a starter for restarting the engine; a test unit configured to perform a failure test of the starter driving unit to determine whether the starter driving unit is out of order before the control unit stops the engine by the eco-run control; a nullifying unit configured to nullify the failure test by the test unit when it is detected that a power supply voltage supplied to the starter driving unit drops below a predetermined value; and a prohibiting unit configured to prohibit the control unit from performing the eco-run control when the test unit determines that the starter driving unit is out of order, wherein the prohibiting unit prohibits the control unit from performing the eco-run control in a case where the nullifying unit nullifies the failure test by the test unit during a test period in which the test unit performs the failure test.

According to this configuration, if the voltage is smaller than the predetermined value in the test period, the execution of eco-run control is prohibited. Accordingly, even if the voltage drops when the starter driving unit is out of order, the execution of eco-run control using the starter driving unit which is out of order can be prevented.

The starter driving unit may be connected to a storage battery for storing electric power through a power switch of which a connection state changes with a predetermined condition, and the test unit may be connected directly to the storage battery without the power switch.

According to this configuration, even if only the voltage supplied to the starter driving unit is smaller than a predetermined value, it is possible to prevent the execution of eco-run control using the starter driving unit which is out of order.

The prohibiting unit may prohibit the control unit from performing the eco-run control until the prohibiting unit determines that the failure test is completed, and the nullifying unit may cause the prohibiting unit not to determine that the failure test is completed even when the failure test is completed, to nullify the failure test when it is detected that the power supply voltage supplied to the starter driving unit drops below the predetermined value during the test period.

According to this configuration, since the prohibiting unit does not determine that the failure test is completed at the time of the voltage reduction at which the starter driving unit does not operate normally, erroneous detection of failure can be prevented.

The prohibiting unit may prohibit the control unit from performing the eco-run control until the test unit completes the failure test, and the nullifying unit may cause the test unit not to perform the failure test, to nullify the failure test when it is detected that the power supply voltage supplied to the starter driving unit drops below the predetermined value during the test period.

According to this configuration, since the test unit does not perform the failure test of the starter driving unit at the time of the voltage reduction at which the starter driving unit does not operate normally, it is possible not only to prevent erroneous detection of the failure but also to use the supplied voltage efficiently.

The test unit may operate a circuit constituting a part of the starter driving unit with a predetermined pattern in the test period, and the nullifying unit may nullify the failure test when it is detected that the power supply voltage supplied to the starter driving unit drops below the predetermined value during the test unit operates the circuit with the predetermined pattern.

According to this configuration, even if the voltage drops so that the circuit malfunctions, the eco-run control using the circuit which is out of order can be prevented.

According to another aspect of at least one embodiment of the present invention, there is provided an eco-run control method, comprising: performing an eco-run control of stopping an engine on the basis of stop conditions and of restarting the engine on the basis of restart conditions; performing a failure test of a starter driving unit which is configured to drive a starter for restarting the engine, to determine whether the starter driving unit is out of order before the engine is stopped by the eco-run control; nullifying the failure test when a power supply voltage supplied to the starter driving unit drops below a predetermined value; prohibiting performing the eco-run control when it is determined that the starter driving unit is out of order; and prohibiting performing the eco-run control in a case where the failure test is nullified during a test period in which the failure test is performed.

According to this configuration, if the voltage is smaller than the predetermined value in the test period, the execution of the eco-run control is prohibited. Accordingly, even if the voltage drops when the starter driving unit is out of order, the execution of the eco-run control using the starter driving unit which is out of order can be prevented.

According to the eco-run control device and the eco-run control method disclosed in this specification, it is possible to prevent the execution of the eco-run control using the starter driving unit which is out of order even at the time of the voltage reduction.

BRIEF DESCRIPTION OF THE DRAWINGS

The above objects and advantages of the present invention will become more apparent by describing in detail exemplary embodiments thereof with reference to the accompanying drawings, wherein:

FIG. 1 is a configuration diagram showing a control system including an eco-run control device according to an embodiment of the present invention;

FIG. 3 is a timing chart showing an example of signals that a microcomputer inputs and outputs;

FIG. 4 is a timing chart showing another example of signals that the microcomputer inputs and outputs;

DETAILED DESCRIPTION OF THE EMBODIMENTS

Figure 2A:
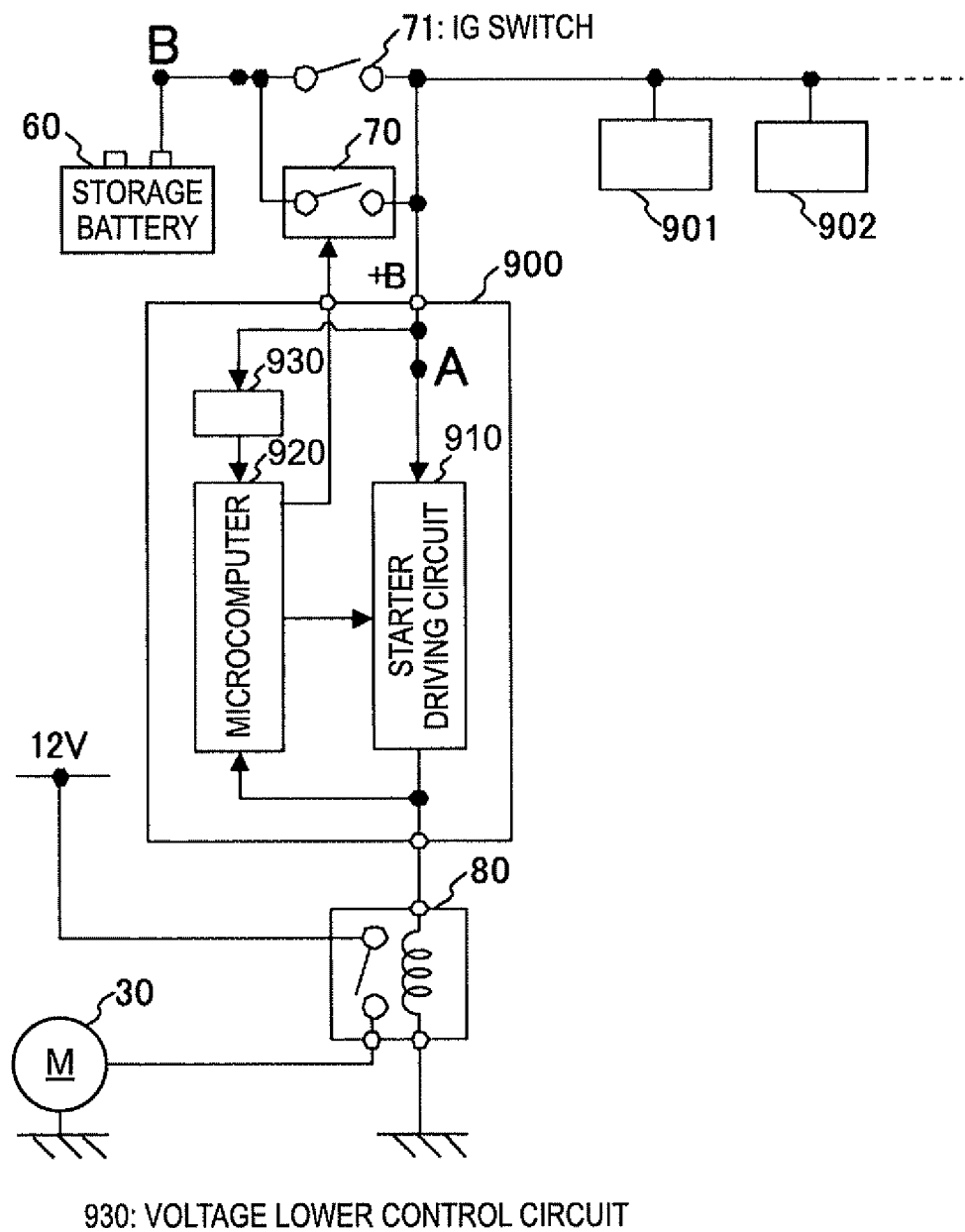
FIGS. 2A and 2B are hardware configuration views showing an example of the configuration of the eco-run control device.

Hereinafter, exemplary embodiments will be described with reference to the accompanying drawings.

FIG. 1 is a configuration diagram showing an eco-run control system including an eco-run control device according to this embodiment of the present invention.

An eco-run control system 1 shown in FIG. 1 is mounted in a vehicle. In the present embodiment, examples of the vehicle include an automobile, a motorbike, a light vehicle, a trolley bus, a military vehicle, and a railroad vehicle. In addition to the vehicles, the eco-run control system 1 may also be mounted in ships, aircraft, and spacecraft such as a space station.

The eco-run control system 1 includes detectors 10 and 20, a starter 30, an engine 40, a display device 50, and control devices 100 and 900. In addition, the eco-run control system 1 also includes a storage battery 60 and relays 70 and 80 which are not shown in FIG. 1.

The detector 10 is formed by various kinds of sensors, such as an engine speed sensor, a vehicle speed sensor, a shift position sensor, a brake switch, a G sensor, an accelerator sensor, and a temperature sensor, for example. The detector 10 detects the number of revolutions of the engine 40, the vehicle speed, shift position, whether or not there is a brake operation, acceleration undergone by the vehicle, accelerator opening, and temperatures related to the vehicle (hereinafter, simply referred to as a temperature or the like) and outputs the detected temperature and the like to the control device 900. In addition, the temperatures related to the vehicle detected by the detector 10 include the water temperature of coolant used to cool the engine 40, the outside air temperature of the vehicle, and the exhaust temperature of a fan provided in an air conditioner (not shown). In addition, the exhaust temperature includes not only the temperature of the outlet of the fan but also the internal temperature within the vehicle around the outlet. The periphery of the outlet refers to a position where the wind blowing from the outlet can be received, for example.

The detector 20 is formed by various kinds of sensors, such as a brake negative pressure sensor and a voltage sensor. The detector 20 detects brake negative pressure and a battery voltage (hereinafter, simply referred to as voltage and the like) and outputs the detected voltage and the like to the control device 900.

In addition, although the eco-run control system 1 includes two sensors of the detectors 10 and 20 in the present embodiment, the invention is not limited thereto. For example, it is possible to adopt a configuration in which the eco-run control system 1 includes one or three or more sensors which detect the temperature or the like detected by the detectors 10 and 20.

The starter 30 is formed by a starter motor, for example. The starter 30 starts up the engine 40 according to the control of the control device 900.

The engine 40 is formed by a gasoline engine or a diesel engine, for example. When an engine driving command instructing the driving is received from the control device 900, the engine 40 is started by the starter 30 to start driving. Then, the engine 40 stops when an engine stop command instructing the stop is received. In addition, the engine 40 which has started the driving generates power for propelling the vehicle by burning fuel according to the control of the control device 900. In addition, the engine 40, the temperature of which has risen due to combustion, is cooled by coolant. In addition, heat from the engine 40 which is absorbed by coolant is discharged to the outside of the vehicle by the air conditioner, for example.

The display device 50 is formed by a display panel, for example, and includes various kinds of meters and warning lamps, such as a MIL lamp. The display device 50 is controlled by the control device 100 and displays various kinds of information. Specifically, the display device 50 displays whether or not eco-run is being performed and whether or not the execution of eco-run is prohibited. More specifically, the display device 50 displays whether or not eco-run is being performed and whether or not the execution of eco-run is prohibited by lighting a predetermined lamp. In addition, the invention is not limited to this. For example, it is possible to adopt a configuration in which the eco-run control system 1 includes a sound output device, such as a speaker or a buzzer, and the sound output device outputs a sound set beforehand corresponding to the content displayed on the display device 50.

Next, the storage battery 60 and the relays 70 and 80 which are not shown in FIG. 1 will be described with reference to FIG. 2A.

The storage battery 60 is formed by a battery, such as a lead battery, for example. The storage battery 60 supplies the stored electric power mainly to the starter 30 and the control device 900.

The relay 70 is formed by a main relay, for example. In addition, the main relay is a power switch whose state of connection to the storage battery 60 changes with predetermined conditions. Specifically, the relay 70 performs ON/OFF operation of the relay on the basis of an ON/OFF state of an IG switch 71. That is, the relay 70 relays the electric power, which is supplied from the storage battery 60, to the control device 900 or cuts off the supply of the electric power to the control device 900.

The relay 80 is controlled by the control device 900 and relays the electric power, which is supplied from the storage battery 60, to the starter 30 or cuts off the supply of the electric power to the starter 30. Specifically, when a current is allowed to flow by the control device 900, the relay 80 relays the electric power to the starter 30.

Next, referring back to FIG. 1, the explanation regarding the eco-run control system 1 will be continued.

The control devices 100 and 900 are formed by ECUs (Electronic control units), for example. The control devices 100 and 900 are communicably connected to each other through a communication line which is formed by a CAN (Controller Area Network) bus or a LIN (Local Interconnect Network) bus, for example. The control device 100 is formed by a meter ECU, for example.

The control device 100 is controlled by the control device 900, and controls the display device 50 to display various kinds of information described above and to be described below.

The control device 900 is connected to the detectors 10 and 20, the starter 30, the engine 40, and the control device 100 which are shown in FIG. 1. In addition, the control device 900 is connected to the storage battery 60 and the relays 70 and 80.

The control device 900 executes eco-run control processing which is software processing. In this case, the control device 900 controls the vehicle to perform an idling stop on the basis of the temperature detected by the detectors 10 and 20. Therefore, the control device 900 will be referred to as the eco-run control device 900 hereinafter. In addition, since eco-run includes an idling stop, the control device 900 will be referred to as the idling stop control device 900 hereinafter.

Specifically, when the control device 900 determines that the predetermined engine stop conditions are satisfied on the basis of signals detected by the detectors 10 and 20 connected to the control device 900, the control device 900 outputs an engine stop command to the control device 100.

As a specific example of the engine stop conditions, conditions may be described in which a vehicle is in a stopped state and the vehicle is in a state where idling can be stopped. Therefore, the control device 900 determines whether or not the vehicle has stopped on the basis of one or more signals indicating engine speed, vehicle speed, shift position, existence of a brake operation, acceleration undergone by the vehicle, an accelerator opening, and the like. For example, when it is determined that a sufficient braking force can be maintained even if idling stops and sufficient electric power to restart the engine 40 is stored in the storage battery 60 on the basis of signals indicating brake negative pressure, battery voltage, and the like, the control device 900 determines that the vehicle is in a state where idling can be stopped.

In addition, when the control device 900 determines that the predetermined engine restart conditions are satisfied on the basis of signals detected by the detectors 10 and 20 connected to the control device 900, the control device 900 drives the starter 30 and outputs an engine driving command to the control device 100.

As a specific example of the engine restart conditions, conditions may be described in which an engine start-up operation by the vehicle driver has been detected or an event to restart the engine has occurred. Therefore, the control device 900 determines whether or not the driver has the intention to start the engine on the basis of changes of one or more of the shift position, a brake switch signal (hereinafter, simply referred to as a brake SW signal), and an accelerator signal, for example. In addition, the control device 900 detects the occurrence of an event, in which the exhaust temperature of the air conditioner drops or rises so that an increase in the engine water temperature or cooling of a refrigerant by engine start-up is needed, on the basis of the exhaust temperature of the air conditioner, for example.

Next, referring back to FIGS. 2A and 2B, the configuration of the control device 900 will be described.

The control device 900 includes a starter driving circuit 910 and a microcomputer 920.

The starter driving circuit 910 is controlled by the microcomputer 920 and restarts the engine 40. Specifically, the starter driving circuit 910 starts the starter 30 when the microcomputer 920 outputs an engine driving command. More specifically, the starter driving circuit 910 turns on the relay 80 when the microcomputer 920 controls the starter driving circuit 910 such that a current flows from a +B power source to the starter 30. On the contrary, the starter driving circuit 910 turns off the relay 80 when the microcomputer 920 controls the starter driving circuit 910 such that a current does not flow.

The microcomputer 920 executes software processing. Specifically, the microcomputer 920 executes eco-run control processing. In addition, before the microcomputer 920 stops the engine 40 by eco-run control, the microcomputer 920 tests an operation of the starter driving circuit 910. When failure is detected on the basis of the test result, the microcomputer 920 prohibits the execution of eco-run control. This is to prevent the control device 900 from being unable to restart the engine 40 after idling stop due to failure of the starter driving circuit.

Here, as shown in FIG. 2A, the eco-run control system 1 has a configuration in which a voltage relayed through the relay 70 is applied to the starter driving circuit 910 and the microcomputer 920 (that is, a configuration in which the electric power is received through the same path). In addition, a guarantee voltage for guaranteeing a normal operation of the starter driving circuit 910 is generally lower than a guarantee voltage of the microcomputer 920. Accordingly, basically, the starter driving circuit 910 performs a normal operation when the microcomputer 920 operates within the guarantee voltage range. In practice, however, the microcomputer 920 can operate even if the voltage is slightly lower than the guarantee voltage. Accordingly, when the microcomputer 920 operates with a voltage equal to or smaller than the guarantee voltage, the failure of the starter driving circuit 910 may be erroneously detected if the starter driving circuit malfunctions due to the low voltage. Especially in a test period for which the microcomputer 920 tests the starter driving circuit 910, if an applied voltage of the starter driving circuit 910 becomes lower than the guarantee voltage of the starter driving circuit 910, the microcomputer 920 may detect the failure erroneously. This is because the starter driving circuit 910 does not operate normally even if the microcomputer 920 operates normally.

Figure 2B:
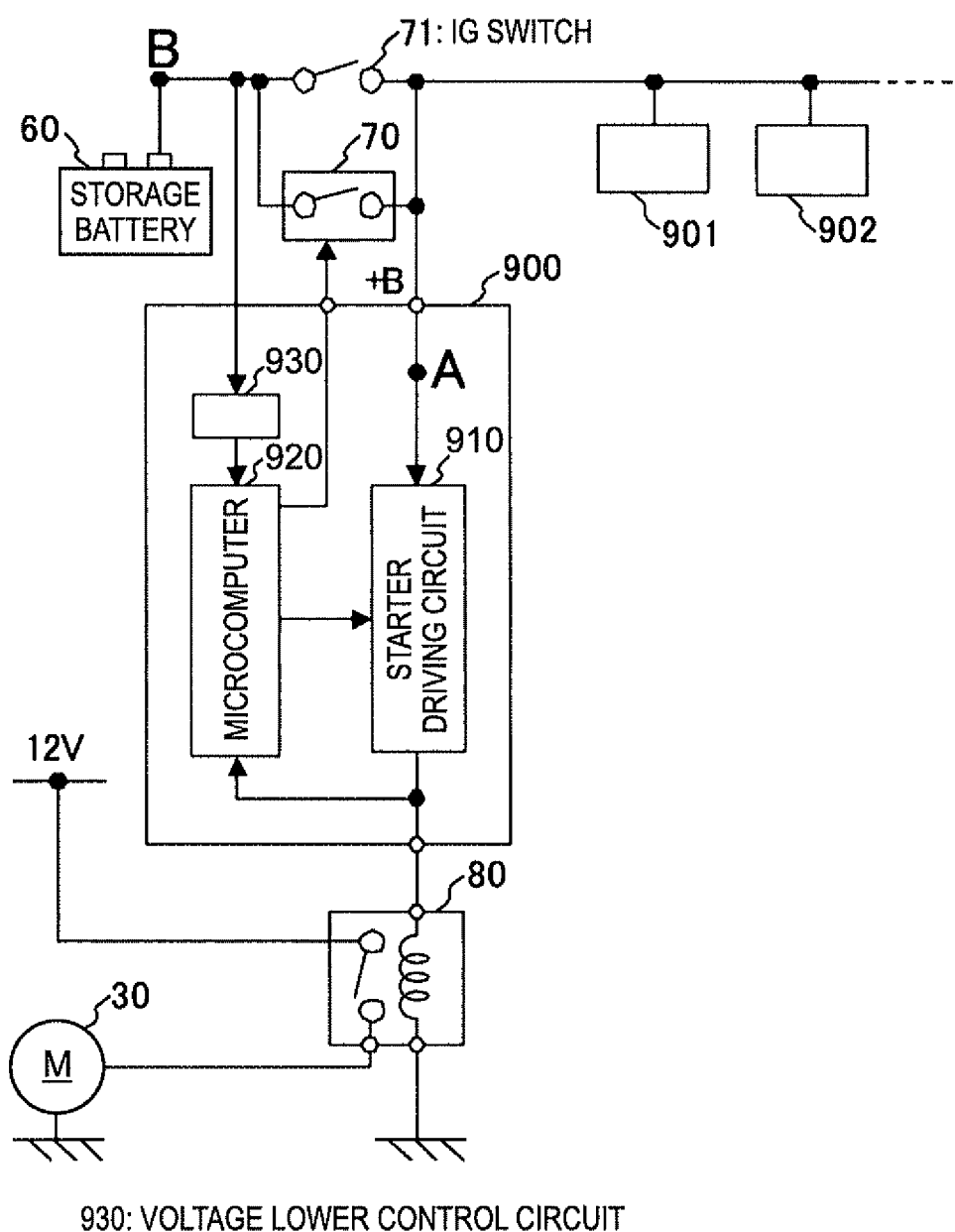

In addition, as shown in FIG. 2B, the eco-run control system 1 may have a configuration in which a voltage relayed through the relay 70 is applied to the starter driving circuit 910 but a voltage is directly applied to the microcomputer 920 by the storage battery 60 (that is, a configuration in which the electric power is received through different paths). Specifically, the electric power path of the microcomputer 920 is a +B-system path in which the electric power is always received from a +B terminal of the storage battery 60 through a voltage lower control circuit 930, and the electric power path of the starter driving circuit 910 is an IG-system path in which the electric power is received while the IG switch 71 (ignition) is in the ON state.

Here, the control devices 900 to 902 shown in FIG. 2A and the control devices 901 and 902 shown in FIG. 2B are IG-system control devices to which electric power is supplied through the IG-system path. Basically, the IG-system control device operates while the IG switch 71 is ON. Among the IG-system control devices 900 and the like, however, there is a control device which performs storage processing and the like on a non-volatile memory provided therein after the IG switch is turned off, for example. Also after the IG switch is turned off, this control device receives the supply of electric power through the IG switch 71 and the main relay 70, which can be ON/OFF controlled by the control device 900 itself or the like, so that the above-described processing can be performed.

On the other hand, the control device 900 shown in FIG. 2B is a +B-system control device. The +B-system control device may operate even if the IG switch 71 is OFF. This is because electric power is always supplied from the storage battery 60 to the microcomputer 920, which is provided in the +B-system control device 900, through a path connected without the IG switch. However, electric power is supplied to the starter driving circuit 910, which is provided in the control device 900, through the IG switch 71. This is to start the starter 30 only when the IG switch 71 is ON so that the power consumption (that is, a dark current) can be suppressed when the IG switch 71 is OFF.

Accordingly, when the voltage relayed through the relay 70 is smaller than the guarantee voltage of the starter driving circuit 910 and the voltage applied by the storage battery 60 is larger than the guarantee voltage of the microcomputer 920 in a test period for which the microcomputer 920 tests the starter driving circuit 910, the microcomputer 920 may detect the failure of the starter driving circuit 910 erroneously as in the configuration shown in FIG. 2A.

Specifically, since power source paths of the microcomputer 920 and the starter driving circuit are the +B-system path and the IG-system path which are different, the supply voltage to the starter driving circuit 910 may drop according to the operating state of other devices connected to the IG system even if there is no drop in the supply voltage to the microcomputer 920 connected in the +B-system path. In addition, as specific examples of other devices connected to the IG system, an EPS (Electric Power Steering) and an air conditioner may be described.

For this reason, if the applied voltage of the starter driving circuit 910 is smaller than the guarantee voltage in a test period, the microcomputer 920 makes a diagnosis mask for masking the failure for the test result of the starter driving circuit 910 (hereinafter, simply referred to as setting diagnosis guard). This is to prevent erroneous detection of failure.

However, if the microcomputer 920 performs eco-run control on the basis of a test result, for which the diagnosis guard is set, when the starter driving circuit 910 is actually out of order, there is a possibility that the engine 40 cannot be restarted due to the failure of the starter driving circuit 910.

Accordingly, an explanation regarding the microcomputer 920 capable of preventing eco-run control using the starter driving circuit 910, which is out of order, even at the time of voltage drop will be continued with reference to FIG. 3. FIG. 3 is a timing chart showing an example of signals that the microcomputer 920 inputs and outputs with the execution of software processing. Specifically, (a) in FIG. 3 shows transition of a +B voltage applied to the starter driving circuit 910. In addition, the voltage detecting position for detecting the +B voltage applied to the starter driving circuit 910 may be either the position A or the position B shown in FIGS. 2A and 2B, for example.

(b) and (c) in FIG. 3 show transition of the number of revolutions and the vehicle speed of the engine 40 used in determination of stop conditions, respectively. (d) to (f) in FIG. 3 show transitions of the values of a failure test permission flag, a failure test execution flag, and a failure completion flag, respectively. (g) in FIG. 3 shows transition of the value of an idling stop permission flag. In addition, the failure test permission flag indicates whether or not the execution of failure testing for the starter driving circuit 910 is permitted, the failure test execution flag indicates whether or not the execution of failure testing is being executed, and the failure completion flag indicates whether or not the execution of failure testing has been completed. In addition, the idling stop permission flag indicates whether or not the execution of idling stop by eco-run control is permitted.

Here, as shown by (a) in FIG. 3, from time t1 to time t3, the microcomputer 920 determines that the +B voltage applied to the starter driving circuit 910 is smaller than the guarantee voltage. Accordingly, in order to prevent erroneous detection of failure of the starter driving circuit 910, the microcomputer 920 sets diagnosis guard for the test result of failure. In addition, as described above, a drop in the +B voltage may occur when a large-capacity load is generated in the storage battery 60 by operation of the air conditioner or EPS, for example.

Then, as shown by (d) in FIG. 3, at time t2, the microcomputer 920 determines that the execution of failure testing is permitted on the basis of a test prerequisite, which will be described later. Accordingly, the value of the failure test permission flag is set to "ON" from time t2 to time t3. As shown by (e) in FIG. 3, the microcomputer 920 starts the execution of failure testing at time t2 and then completes the execution of failure diagnosis at time t3.

Then, as shown by (f) in FIG. 3, the microcomputer 920 does not determine that the failure test is completed at time t4 despite the end of the failure test at time t3. This is because the applied voltage of the starter driving circuit 910 is smaller than the guarantee voltage in the test period of the starter driving circuit 910 from time t2 to time t3. Accordingly, as shown by (g) in FIG. 3, the microcomputer 920 does not permit the execution of idling stop until it is determined that the failure test has been completed.

Then, as shown by (a) in FIG. 3, from time t5, the microcomputer 920 does not determine that the +B voltage is smaller than the guarantee voltage of the starter driving circuit 910. Accordingly, the microcomputer 920 does not set the diagnosis guard. Then, as shown by (d) and (e) in FIG. 3, from time t7, the value of the failure test permission flag is set to "ON" to execute the failure test.

Then, as shown by (f) in FIG. 3, at time t8, the microcomputer 920 determines that the failure test is completed. This is because the applied voltage of the starter driving circuit 910 is not smaller than the guarantee voltage from time t7 to time t8. Here, the microcomputer 920 does not detect the failure of the starter driving circuit 910 from the result of the completed failure test. Accordingly, as shown by (g) in FIG. 3, at time t9, the microcomputer 920 permits the execution of idling stop when the engine stop conditions are satisfied by stopping of the vehicle as shown by (c) in FIG. 3. In addition, as shown by (g) in FIG. 3, at time t9, the microcomputer 920 executes idling stop to stop the engine 40.

Next, another example of signals that the microcomputer 920 inputs and outputs will be described with reference to FIG. 4. FIG. 4 is a timing chart showing another example of signals that the microcomputer 920 inputs and outputs. In addition, since FIG. 4 shows almost the same content as in FIG. 3, a different point will be mainly described below. The main difference is that the microcomputer 920 does not detect the failure of the starter driving circuit 910 if the applied voltage is smaller than the guarantee voltage of the starter driving circuit 910 in a test period.

As shown by (a) in FIG. 4, from time t1 to t3, the microcomputer 920 determines that the +B voltage applied to the starter driving circuit 910 is smaller than the guarantee voltage, Accordingly, as shown by (d) in FIG. 4, at time t2, the microcomputer 920 does not permit the execution of failure testing even if the test prerequisite is satisfied, unlike (d) in FIG. 3. Accordingly, the value of the failure test permission flag is maintained as "OFF" from time t2 to time t3. As a result, since a failure test is not permitted, the microcomputer 920 does not start the execution of failure testing from time t2 as shown by (e) in FIG. 4. In addition, as shown by (f) in FIG. 4, the microcomputer 920 does not determine that the failure test is completed at time t4, unlike (f) in FIG. 3. Accordingly, as shown by (g) in FIG. 4, the microcomputer 920 does not permit the execution of idling stop until it is determined that the failure test is completed.

Figure 5A:
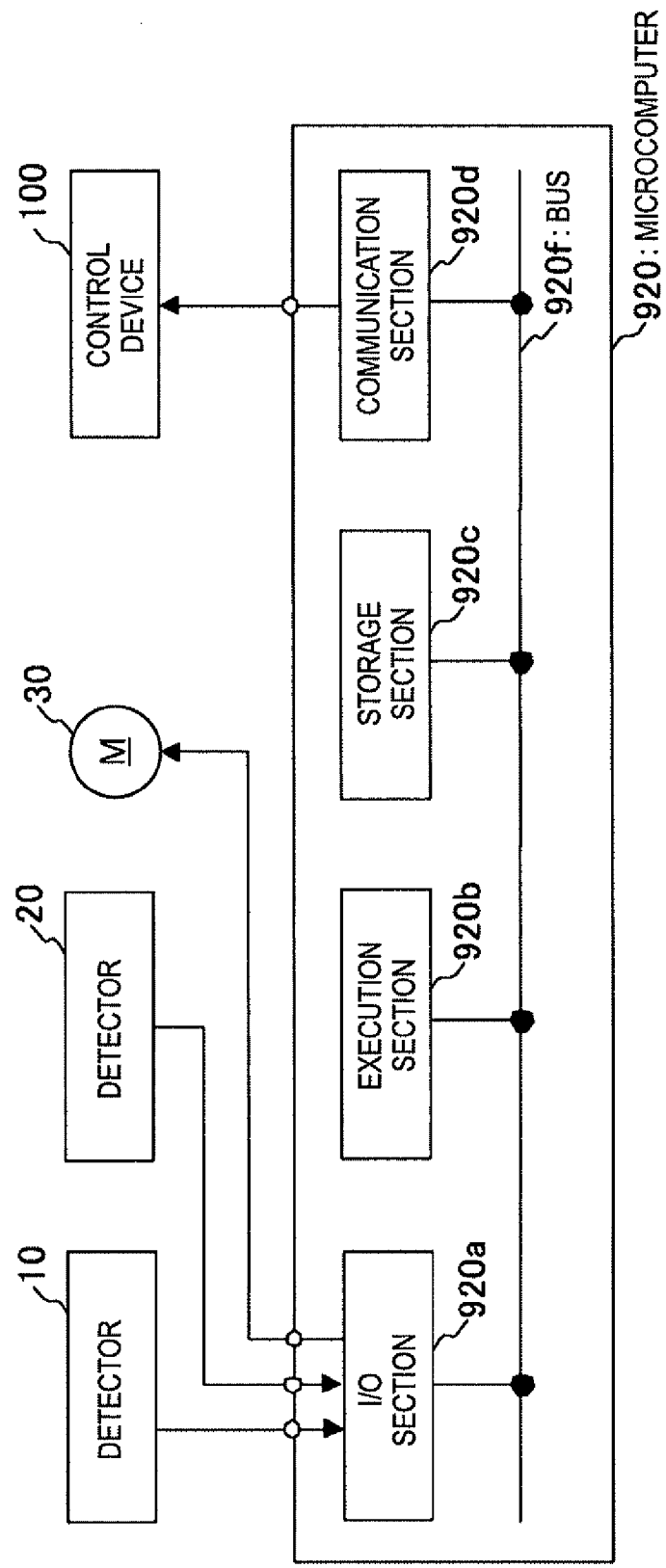
FIGS. 5A and 5B are block diagrams showing the configuration of the microcomputer.
Figure 5B:
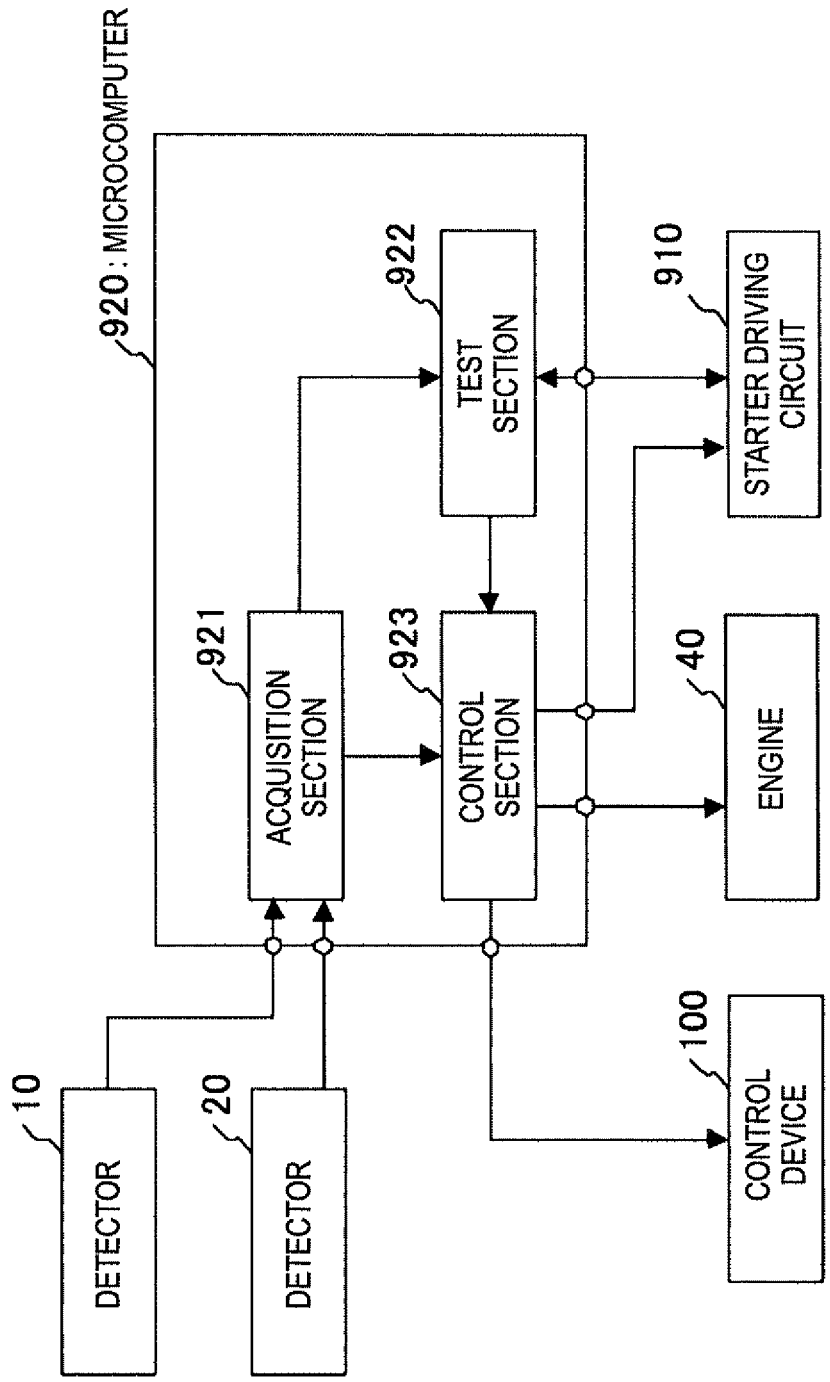

Next, the configuration of the microcomputer 920 that the control device 900 uses in order to execute software processing will be described with reference to FIGS. 5A and 5B. FIG. 5A is a view showing the hardware configuration which is an example of the configuration of the microcomputer 920.

The microcomputer 920 shown in FIG. 5A is configured to include an I/O section 920a (for example, an A/D converter), an execution section 920b (for example, a CPU (Central Processing Unit)), a storage section 920c (for example, a ROM (Read-Only Memory)), and a communication section 920d (for example, a CAN controller). In addition, the I/O section 920a, the execution section 920b, the storage section 920c, and the communication section 920d are connected to each other by a bus 920f so that transmission and reception of information therebetween are possible.

Software processing is realized by making the execution section 920b read a program stored in the storage section 920c and performing the operation according to the execution procedure of software processing indicated by the read program. In addition, the information indicating the result of the operation performed by the execution section 920b is written in the storage section 920c. Moreover, if necessary, the I/O section 920a and the communication section 920d input and output the information, which is input and output or communicated with various sections or devices connected thereto, as information to be operated by the execution section 920b or information indicating the operation result of the execution section 920b.

Next, the configuration of the microcomputer 920 will be described with reference to FIG. 5B focusing on the function. FIG. 5B is a functional block diagram showing an example of the configuration of the microcomputer 920.

The microcomputer 920 includes an acquisition section 921, a test section 922, and a control section 923. The acquisition section 921 is realized by executing acquisition processing using the execution section 920b. The acquisition section 921 acquires signals output from the detectors 10 and 20. Specifically, the acquisition section 921 acquires a signal for determining whether or not the engine stop conditions and the engine restart conditions are satisfied. More specifically, the acquisition section 921 acquires a signal indicating the temperature and the like described above and a signal indicating the voltage and the like described above. In addition, the acquisition section 921 may be configured to acquire a signal, which is output from the starter driving circuit 910 to the starter 30, in order to monitor a voltage (that is, a monitor voltage) applied to the starter 30 through the starter driving circuit 910.

The test section 922 is realized by executing test processing using the execution section 920*b*. The test section 922 tests the failure of the starter driving circuit 910 and also outputs the test result to the control section 923.

The control section 923 is realized by executing control processing using the execution section 920*b*. The control section 923 executes eco-run control on the basis of the signal acquired by the acquisition section 921 and the test result obtained by performing a test on the starter driving circuit 910 using the test section 922.

Figure 6A:
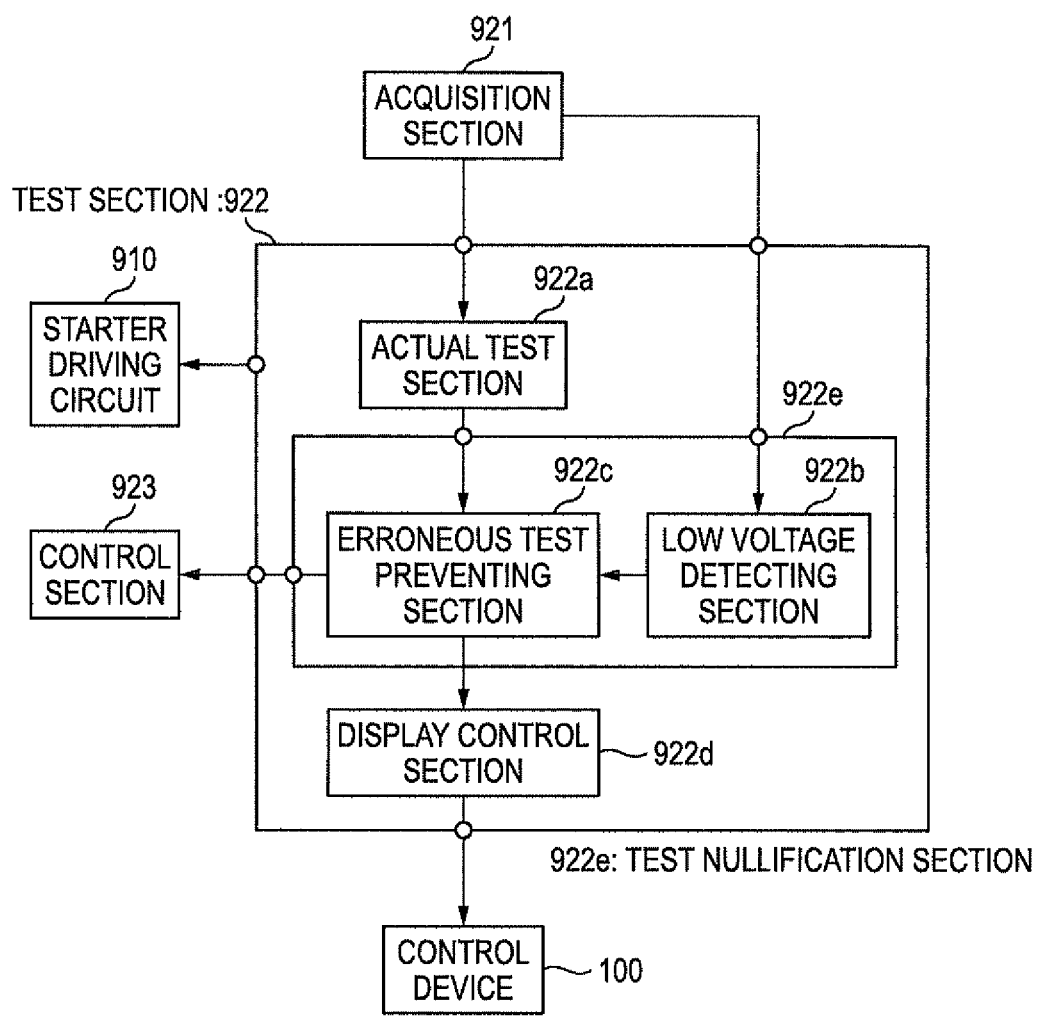
FIGS. 6A and 6B are functional block diagrams showing the configuration of a test section.

Here, the configuration of the test section 922 will be described with reference to FIG. 6A. FIG. 6A is a functional block diagram showing an example of the configuration of the test section 922.

The test section 922 shown in FIG. 6A includes an actual test section 922*a*, a display control section 922*d*, and a test nullification section 922*e*.

The actual test section 922*a* is realized by executing actual test processing using the execution section 920*b*. Before the engine 40 is stopped by eco-run control, the actual test section 922*a* tests an operation of the starter driving circuit 910 to detect the failure of the starter driving circuit 910. That is, the actual test section 922*a* determines whether or not the starter driving circuit 910 is out of order. Specifically, the actual test section 922*a* tests an operation of the starter driving circuit 910 according to the test pattern provided (that is, transmitted) by the control section 923. Specifically, the actual test section 922*a* provides a conducting pattern, which makes an internal circuit of the starter driving circuit 910 operate although a current does not flow through the starter 30, to the internal circuit of the starter driving circuit 910 which controls the supply of electric power to the starter 30. That is, the actual test section 922*a* detects failure of the starter driving circuit 910 if a monitor voltage increases up to a predetermined value when a pattern other than the conducting pattern is executed. Moreover, regarding a pattern for driving the starter 30, the actual test section 922*a* performs failure detection by executing the pattern when control of driving the starter 30 is actually performed to start up the engine, so that the starter 30 is not started up at the time of testing by execution of the pattern.

In addition, as described above with reference to FIGS. 4A to 4G, the actual test section 922*a* may be configured not to test the failure of the starter driving circuit 910 according to the control of the test nullification section 922*e* if a low voltage detecting section 922*b* determines that the applied voltage is smaller than the guarantee voltage of the starter driving circuit 910 in a test period.

According to this configuration, since the failure of the starter driving circuit 910 is not tested at the time of low voltage at which the starter driving circuit 910 does not operate normally, it is possible not only to prevent erroneous detection of failure but also to use the supplied voltage efficiently.

Before describing the display control section 922*d*, the test nullification section 922*e* will be described. The test nullification section 922*e* is realized by executing test nullification processing using the execution section 920*b*. The test nullification section 922*e* includes the low voltage detecting section 922*b* and an erroneous test preventing section 922*c*.

The low voltage detecting section 922*b* is realized by executing low voltage detection processing using the execution section 920*b*. The low voltage detecting section 922*b* detects a voltage drop by determining whether or not the voltage applied to the starter driving circuit 910 has dropped. Specifically, the low voltage detecting section 922*b* determines whether or not the applied voltage applied to the starter driving circuit 910 is smaller than the guarantee voltage of the starter driving circuit 910, for example, on the basis of a signal acquired by the acquisition section 921. In addition, the low voltage detecting section 922*b* may be configured to change the guarantee voltage of the starter driving circuit 910, which is used for determination, according to the temperature of the starter driving circuit 910. In addition, the low voltage detecting section 922*b* may also be configured to calculate the temperature of the starter driving circuit 910 on the basis of the temperature related to the vehicle acquired by the acquisition section 921. This is because the temperature of the starter driving circuit 910 is estimated, for example, by the outside air temperature of the vehicle or the inside temperature of the vehicle included in the temperatures related to the vehicle. According to this configuration, it is possible not only to reliably prevent erroneous detection but also to reliably prevent eco-run control using the starter driving circuit 910 which is out of order.

The erroneous test preventing section 922*c* is realized by executing erroneous test prevention processing using the execution section 920*b*. The erroneous test preventing section 922*c* nullifies the test of the actual test section 922*a* if the power supply voltage supplied to the starter driving circuit 910 is equal to or smaller than a predetermined value. Specifically, when the low voltage detecting section 922*b* determines that the voltage has dropped in a test period for which the actual test section 922*a* tests the starter driving circuit 910, the erroneous test preventing section 922*c* sets diagnosis guard to perform diagnosis mask for the test result output from the actual test section 922*a*. For this reason, the erroneous test prevention processing is also called mask processing, and the erroneous test preventing section 922*c* is also called a mask section 922*c*. Moreover, as described above, as nullification of a test, the erroneous test preventing section 922*c* provided in the test nullification section 922*e* may not set diagnosis guard for the test result of the actual test section 922*a* after the test, but may make the actual test section 922*a* not perform the test itself.

The display control section 922*d* is realized by executing display control processing using the execution section 920*b*. The display control section 922*d* controls display of the display device 50 on the basis of a test result on which the erroneous test preventing section 922*c* sets the diagnosis guard when necessary. Specifically, when the test result indicates failure, the display control section 922*d* controls the control device 100 to display on the display device 50 the fact that the starter driving circuit 910 has failed.

Figure 7:
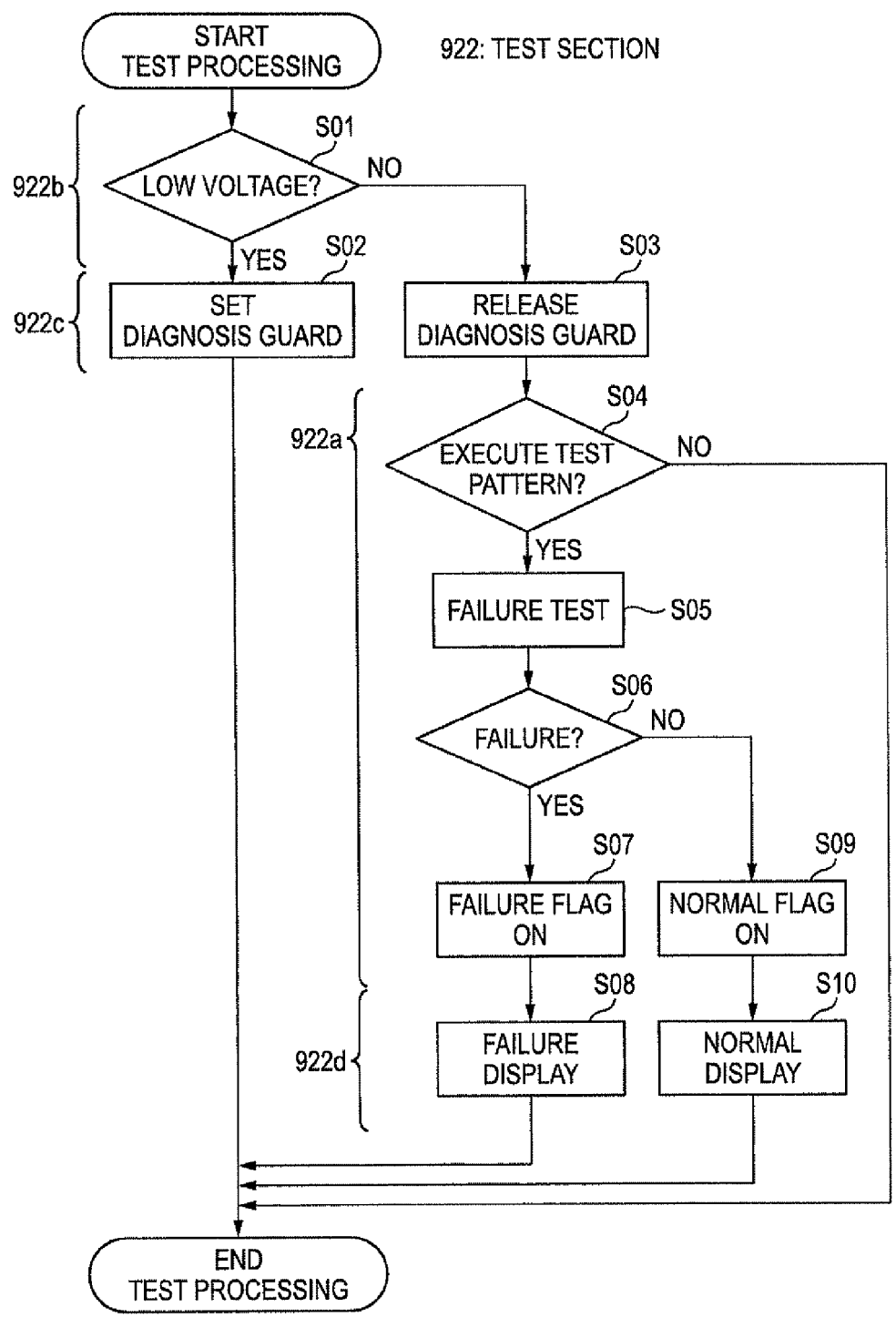
FIG. 7 is a flow chart showing a test processing executed by an execution section.

Next, test processing for realizing the test section 922 will be described with reference to FIG. 7. FIG. 7 is an example of a flow chart showing the test processing executed by the execution section 920*b*. In addition, the execution section 920*b* executes the test processing at predetermined periods, for example, when a failure test is permitted.

First, the execution section 920*b* determines whether or not the starter driving circuit 910 is in a low voltage state (step S01). The execution portion 920*b* executes processing in step S02 when it is determined that the starter driving circuit 910 is in a low voltage state, and executes processing in step S03 otherwise.

When it is determined that the starter driving circuit 910 is in a low voltage state in step S01, the execution section 920*b* sets diagnosis guard for the test result (step S02). Then, the execution section 920*b* ends the execution of the test processing.

When it is determined that the starter driving circuit 910 is not in a low voltage state in step S01, the execution section 920b releases the setting of the diagnosis guard (step S03). Then, the execution section 920b determines whether to execute a test pattern (step S04). As a specific example, the execution section 920b determines that a test pattern is executed when the control section 923 transmits the test pattern. The execution section 920b executes processing in step S05 when it is determined that the test pattern is executed, and ends the test processing otherwise.

When it is determined that the test pattern is executed in step S04, the execution section 920b tests the failure of the starter driving circuit 910 using the test pattern transmitted by the control section 923 (step S05). Then, the execution section 920b determines, for example, whether or not a problem, such as failure, has been detected from the starter driving circuit 910 on the basis of the test result (step S06). The execution section 920b executes processing in step S07 when it is determined that a failure has been detected, and executes processing in step S09 otherwise.

When it is determined that a failure has been detected in step S06, the execution section 920b sets the value of a failure flag, which indicates that the starter driving circuit 910 is out of order, to "ON" (step S07). Then, the execution section 920b controls the control device 100 to display on the display device 50 the fact that the starter driving circuit 910 is out of order (step S08). Then, the execution section 920b ends the execution of the test processing.

When it is determined that a failure has not been detected in step S06, the execution section 920b sets the value of the failure flag, which indicates that the starter driving circuit 910 is normal, to "ON" (step S09). Then, the execution section 920b controls the control device 100 to display on the display device 50 the fact that the starter driving circuit 910 is normal (step S10). Then, the execution section 920b ends the execution of the detection processing.

In addition, in FIG. 7, the processing in step S01 is equivalent to an example of low voltage detection processing for realizing the low voltage detecting section 922b, and the processing in steps S02 and S03 is equivalent to an example of erroneous test prevention processing for realizing the erroneous test preventing section 922c. In addition, the processing in steps S04 to S07 and S09 is equivalent to an example of actual test processing for realizing the actual test section 922a, and the processing in steps S08 and S10 is equivalent to an example of display control processing for realizing the display control section 922d.

Figure 6B:
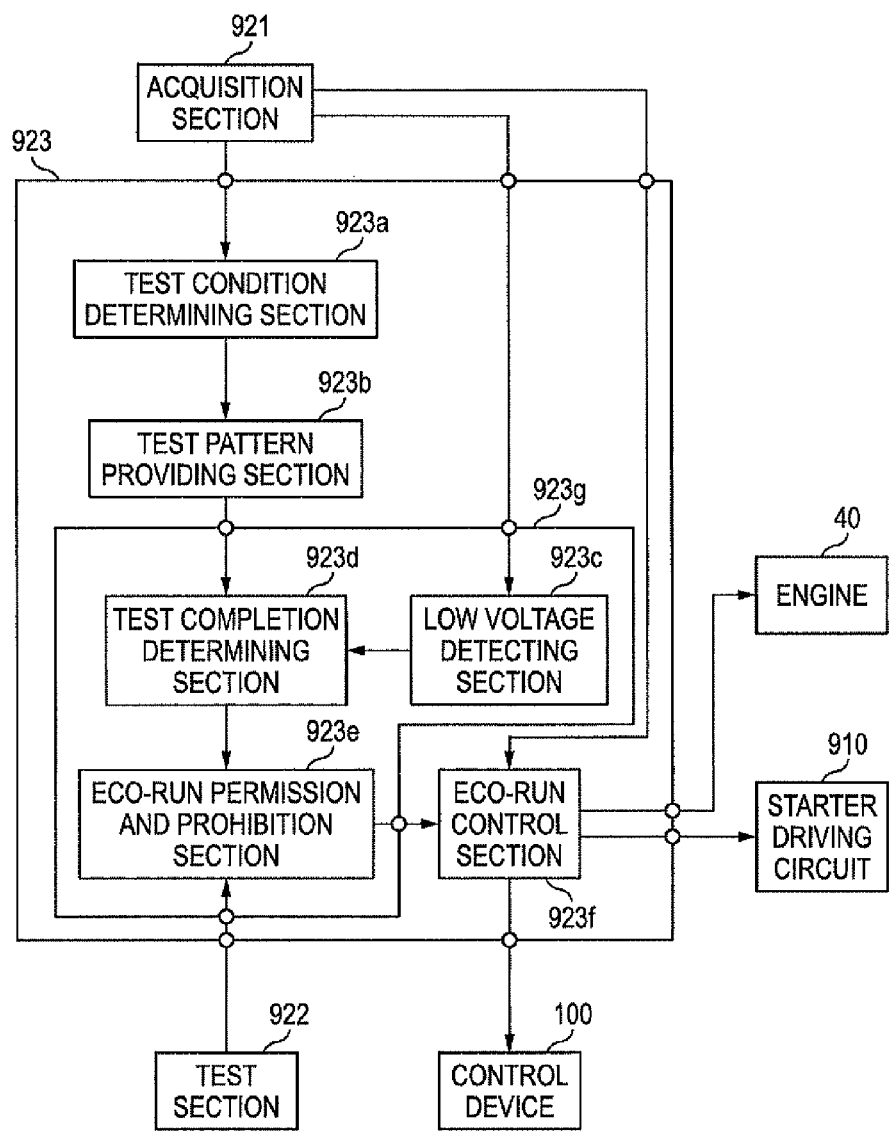

Next, referring back to FIG. 6B, the configuration of the control section 923 will be described. FIG. 6B is a functional block diagram showing an example of the configuration of the control section 923.

The control section 923 shown in FIG. 6B includes a test condition determining section 923a, a test pattern providing section 923b, an eco-run control section 923f, and a prohibition section 923g.

The test condition determining section 923a is realized by executing test condition determination processing using the execution section 920b. The test condition determining section 923a determines whether or not a test prerequisite is satisfied on the basis of a signal acquired by the acquisition section 921. Here, the test prerequisite includes a condition of "before the engine 40 stops by eco-run control". More specifically, the test prerequisite includes a condition in which a vehicle does not stop and the failure of the starter driving circuit 910 is not detected. As a specific example, the test condition determining section 923a determines whether or not the test prerequisite is satisfied on the basis of a vehicle speed and the number of revolutions of the engine 40, which are indicated by signals acquired by the acquisition section 921.

The test pattern providing section 923b is realized by executing test pattern providing processing using the execution section 920b. The test pattern providing section 923b provides (that is, transmits) the test pattern, which is stored beforehand, to the test section 922 when the test condition determining section 923a determines that the test prerequisite is satisfied.

Before describing the eco-run control section 923f, the prohibition section 923g will be described. The prohibition section 923g is realized by executing prohibition processing using the execution section 920b. The prohibition section 923g includes a low voltage detecting section 923c, a test completion determining section 923d, and an eco-run permission and prohibition section 923e.

The low voltage detecting section 923c is realized by executing low voltage detection processing using the execution section 920b. The low voltage detecting section 923c has almost the same function as the low voltage detecting section 922b. In order to describe it more specifically, the case where the control device 900 has a configuration shown in FIG. 2A will be described. In this case, the low voltage detecting section 922b determines whether or not the voltage relayed through the relay 70 is a voltage in a predetermined range which is smaller than the guarantee voltage of the starter driving circuit 910 and larger than the guarantee voltage of the microcomputer 920 in a test period of the test section 922. According to this configuration, since the starter driving circuit 910 does not operate normally when the voltage relayed through the relay 70 is a voltage in a predetermined range, the prohibition section 923g which operates normally prohibits the execution of eco-run control regardless of the test result of the starter driving circuit 910. As a result, even if the applied voltage is a voltage in a predetermined range, it is possible to prevent the execution of eco-run control using the starter driving circuit 910 which is out of order. In addition, if the voltage relayed to both the starter driving circuit 910 and the microcomputer 920 is cut off by the relay 70, the generation of a dark current in the starter driving circuit 910 and the microcomputer 920 is suppressed. As a result, the power consumption can be reduced.

In addition, the case where the control device 900 has a configuration shown in FIG. 2B will be described. In this case, the low voltage detecting section 922b determines whether or not the voltage relayed through the relay 70 is smaller than the guarantee voltage of the starter driving circuit 910 and whether or not a voltage applied by the storage battery 60 is larger than the guarantee voltage of the microcomputer 920 in a test period of the test section 922. According to this configuration, if the voltage relayed through the relay 70 is smaller than the guarantee voltage of the starter driving circuit 910 and the voltage applied by the storage battery 60 is larger than the guarantee voltage of the prohibition section 923g, the starter driving circuit 910 does not operate normally. For this reason, the prohibition section 923g prohibits the execution of eco-run control regardless of the test result of the starter driving circuit 910. As a result, even if the applied voltage of the starter driving circuit 910 is smaller than the guarantee voltage, it is possible to prevent the execution of eco-run control using the starter driving circuit 910 which is out of order.

The test completion determining section 923d is realized by executing test completion determination processing using the execution section 920b. The test completion determining section 923d determines whether or not the test section 922 has completed testing the failure of the starter driving circuit 910. Here, when the low voltage detecting section 923c determines that the voltage has dropped in the test period of the test section 922, the test completion determining section 923d does not determine that the test has been completed even if the test section 922 has actually completed the failure test. According to this configuration, since it is determined that the failure test has been completed at the time of low voltage at which the starter driving circuit 910 does not operate normally, erroneous detection of failure can be prevented.

The eco-run permission and prohibition section 923e is realized by executing eco-run permission and prohibition processing using the execution section 920b. The eco-run permission and prohibition section 923e prohibits the eco-run control section 923f from executing eco-run control until the test completion determining section 923d determines that the failure test has been completed. Then, if the test completion determining section 923d determines that the failure test has been completed, the eco-run permission and prohibition section 923e permits or prohibits the execution of eco-run control on the basis of a result of the completed failure test. That is, when the test nullification section 922e provided in the test section 923 nullifies the test of the actual test section 922a in a test period for which the test section 922 tests the starter driving circuit 910, the eco-run permission and prohibition section 923e prohibits the execution of eco-run control. Specifically, when the low voltage detecting section 923c determines that the applied voltage of the starter driving circuit 910 is smaller than the guarantee voltage in the test period of the test section 922, the eco-run permission and prohibition section 923e continues prohibiting the execution of eco-run control. According to this configuration, since the execution of eco-run control is prohibited if the applied voltage is smaller than the guarantee voltage of the starter driving circuit 910 in a test period, the execution of eco-run control using the starter driving circuit 910 which is out of order can be prevented even at the time of voltage drop. In addition, if a low voltage does not occur in the test period, the eco-run permission and prohibition section 923e does not permit but prohibit the execution of eco-run control when the test section 922 detects failure of the starter driving circuit 910 on the basis of a test result.

The eco-run control section 923f is realized by executing eco-run control processing using the execution section 920b. The eco-run control section 923f executes eco-run control processing according to the permission or prohibition of the eco-run permission and prohibition section 923e. Specifically, when it is determined that the above-described engine stop conditions are satisfied on the basis of a signal acquired by the acquisition section 921, the eco-run control section 923f stops the engine 40. Moreover, when it is determined that the above-described engine restart conditions are satisfied, the eco-run control section 923f controls the starter driving circuit 910 to restart the engine 40.

Figure 8A:
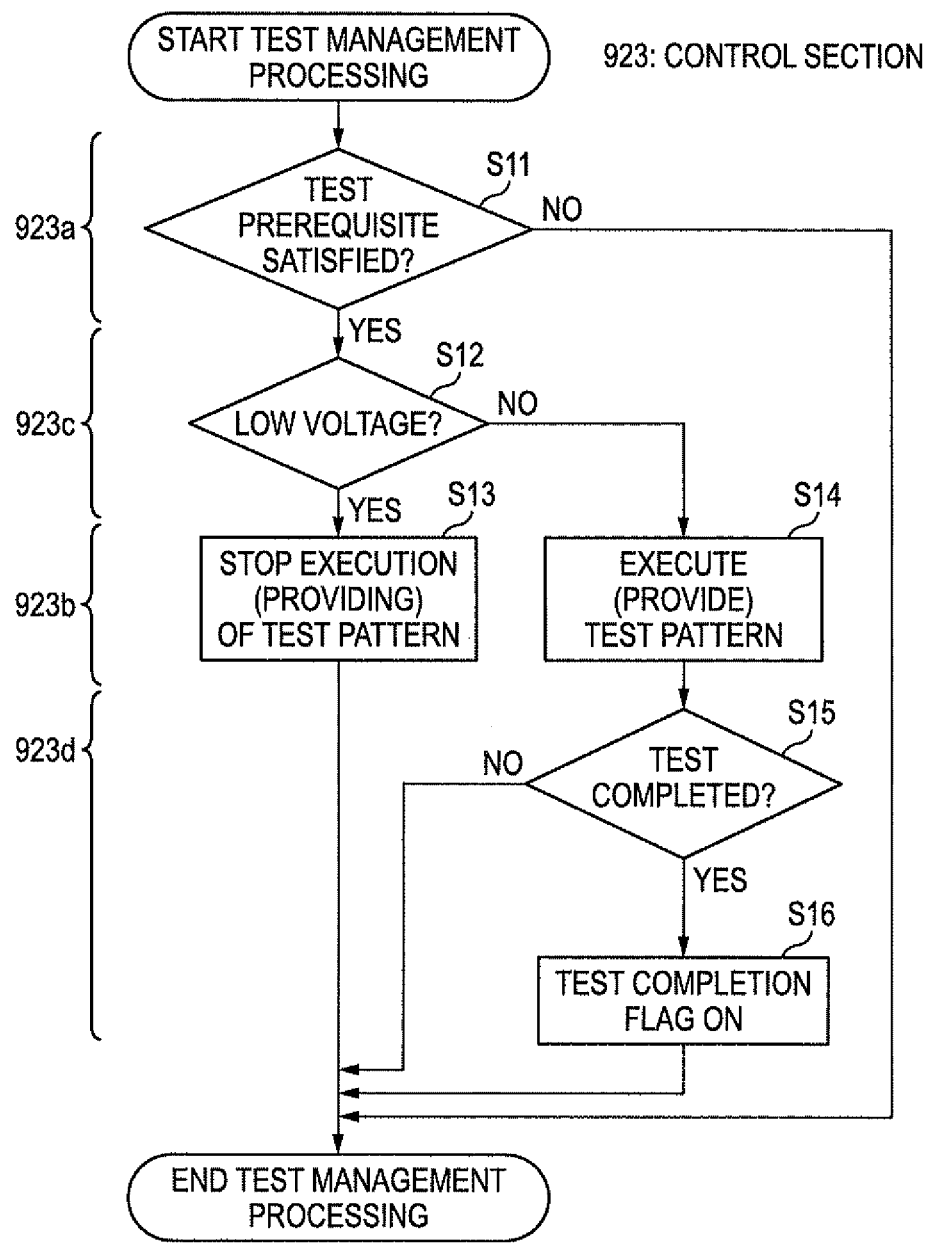
FIGS. 8A to 8C are flow charts showing processing executed by an execution section.
Figure 8B:
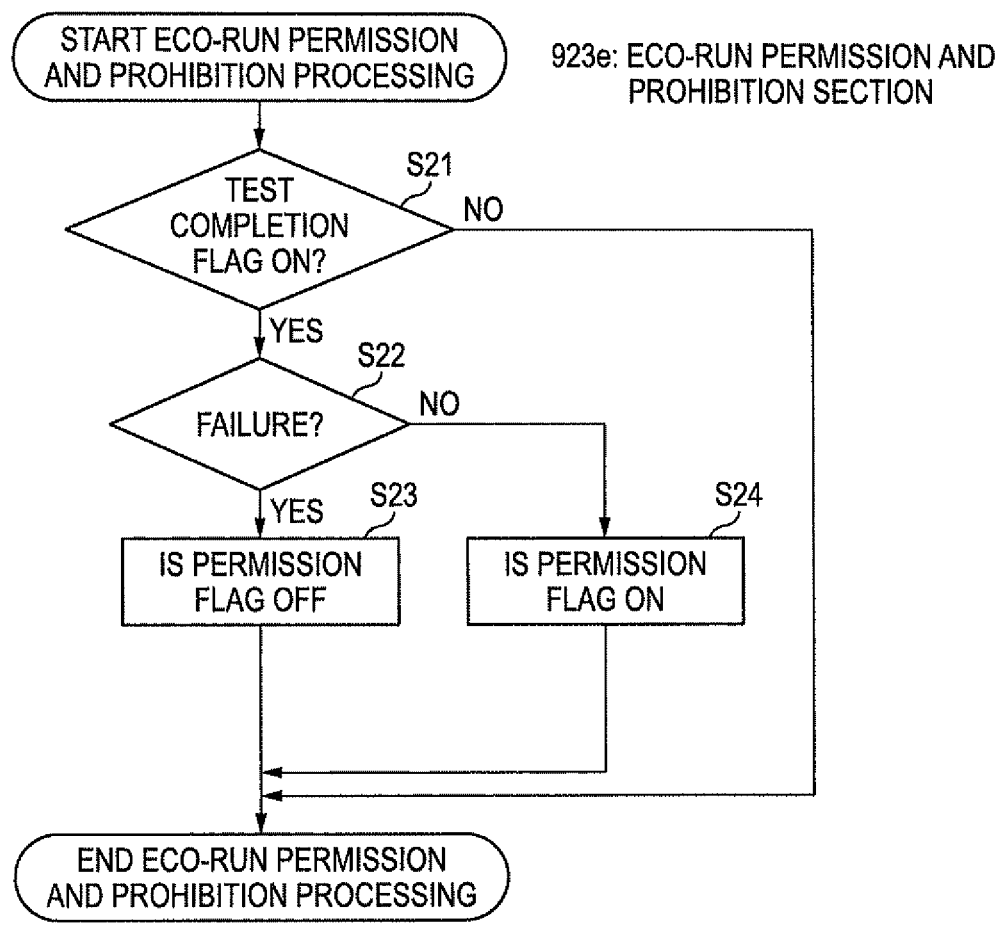
Figure 8C:
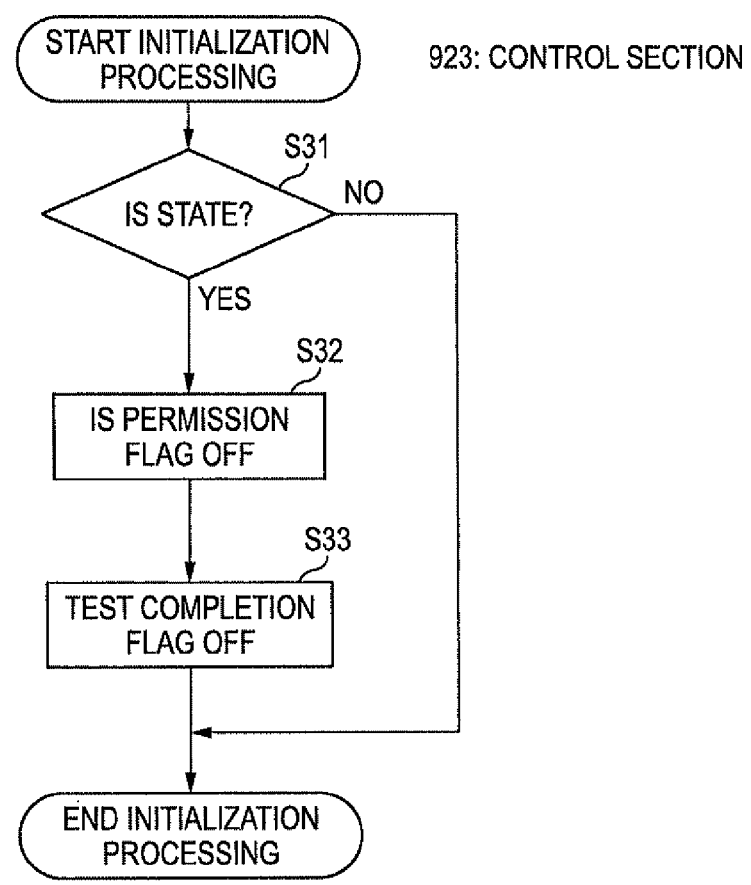

Next, control processing for realizing the control section 923 will be described with reference to FIGS. 8A to 8C. In addition, the control processing includes test management processing, eco-run permission and prohibition processing, and initialization processing. The test management processing is processing for managing the execution of test processing performed by the execution section 920b. In addition, the eco-run permission and prohibition processing is processing for permitting or prohibiting the execution of eco-run control on the basis of an execution result of test processing, and the initialization processing is processing for initializing a variable used in the eco-run permission and prohibition processing. FIG. 8A is a flow chart showing an example of the test management processing executed by the execution section 920b.

First, the execution section 920b determines whether or not the test prerequisite is satisfied as described above (step S11). The execution section 920b executes processing in step S12 when it is determined that the test prerequisite is satisfied, and ends the test management processing.

When it is determined that the test prerequisite is satisfied in step S11, the execution section 920b determines whether or not the starter driving circuit 910 is in a low voltage state in the test period (step S12). The execution portion 920b executes processing in step S13 when it is determined that the starter driving circuit 910 is in a low voltage state, and executes processing in step S14 otherwise.

When it is determined that the starter driving circuit 910 is in a low voltage state in step S12, the execution section 920b stops providing a test pattern to the test section 922 (step S13). Then, the execution section 920b ends the execution of the test management processing without determining the completion of the test.

When it is determined that the starter driving circuit 910 is not in a low voltage state in step S12, the execution section 920b provides a test pattern to the test section 922 (step S14). Then, the execution section 920b determines whether or not the failure test of the test section 922 has been completed (step S15). The execution section 920b executes processing in step S16 when it is determined that the failure test has been completed, and ends the test management processing otherwise.

When it is determined that the failure test of the test section 922 has been completed in step S15, the execution section 920b sets the value of the test completion flag to "ON" in order to show the completion of the failure test (step S16). Then, the execution section 920b ends the execution of the test management processing.

In addition, in FIG. 8A, the processing in step S11 is equivalent to an example of test condition determination processing for realizing the test condition determining section 923a, and the processing in step S12 is equivalent to an example of low voltage detection processing for realizing the low voltage detecting section 923c. In addition, the processing in steps S13 and S14 is equivalent to an example of test pattern providing processing for realizing the test pattern providing section 923b, and the processing in steps S15 and S16 is equivalent to an example of test completion determination processing for realizing the test completion determining section 923d.

Next, eco-run permission and prohibition processing for realizing the eco-run permission and prohibition section 923e will be described with reference to FIG. 8B. FIG. 8B is a flow chart showing an example of eco-run permission and prohibition processing executed by the execution section 920b.

First, the execution section 920b determines whether or not the failure test has been completed (step S21). Specifically, the execution section 920b determines that the failure test has been completed when the test completion flag is the value "ON". The execution section 920b ends the processing in step S22 when it is determined that the failure test has been completed, and ends the execution of the execution of eco-run permission and prohibition processing otherwise.

When it is determined that the failure test has been completed in step S21, the execution section 920b determines whether or not a problem, such as failure, has been detected from the starter driving circuit 910 on the basis of the test result (step S22). The execution section 920b executes processing in step S23 when it is determined that a failure has been detected, and executes processing in step S24 otherwise.

When it is determined that a failure has been detected in step S22, the execution section 920b prohibits idling stop (hereinafter, simply referred to as IS) caused by eco-run control (step S23). Specifically, the execution section 920b sets the value of an IS permission flag to "OFF". Then, the execution section 920b ends the execution of the eco-run permission and prohibition processing.

When it is determined that a failure has not been detected in step S22, the execution section 920b permits IS (step S24). Specifically, the execution section 920b sets the value of the IS permission flag to "ON". Then, the execution section 920b ends the execution of the eco-run permission and prohibition processing.

Next, the initialization processing executed by the execution section 920b will be described with reference to FIG. 8C. FIG. 8C is a flow chart showing an example of the initialization processing executed by the execution section 920b.

First, the execution section 920b determines whether or not a current state is an IS state where idling stop is performed (step S31). When it is determined that the current state is an IS state, the execution section 920b ends the execution of the initialization processing. Otherwise, the execution section 920b initializes both the IS permission flag and the test ending flag to the value "OFF" and then ends the execution of the initialization processing (steps S32 and S33).

In the present embodiment, the eco-run control section 923f is equivalent to an example of a control means, the actual test section 922a is equivalent to an example of a test means, the test nullification section 922e is equivalent to an example of test nullification processing, and the prohibition section 923g is equivalent to an example of a prohibition means. In addition, the starter driving circuit 910 is equivalent to an example of a starter driving means, and the relay 70 is equivalent to an example of a power switch.

Here, an eco-run control method of the invention may be executed using the control device 900.

In addition, a program executed by the control device 900 may be provided by distribution in a state where the program is stored in a magnetic disk or an optical disk, a semiconductor memory, and other recording media or by distribution through a network.

In addition, some or all of the functions realized by executing software processing by the control device 900 may be realized using a hardware circuit. Conversely, some or all of the functions realized by executing the hardware circuit by the control device 900 may also be realized by executing software processing.

While the preferred embodiments of the invention have been described in detail, it should be understood that the invention is not limited to those specific embodiments but various changes and modifications thereof could be made without departing from the spirit and scope of the invention as defined in the appended claims.

What is claimed is:

1. An eco-run control device, comprising:
a control unit configured to perform an eco-run control of stopping an engine on the basis of stop conditions and of restarting the engine on the basis of restart conditions;
a starter driving unit configured to drive a starter for restarting the engine;
a test unit configured to perform a failure test of the starter driving unit to determine whether the starter driving unit is out of order before the control unit stops the engine by the eco-run control;
a nullifying unit configured to nullify the failure test by the test unit when it is detected that a power supply voltage supplied to the starter driving unit drops below a predetermined value; and
a prohibiting unit configured to prohibit the control unit from performing the eco-run control when the test unit determines that the starter driving unit is out of order, wherein
the prohibiting unit prohibits the control unit from performing the eco-run control in a case where the nullifying unit nullifies the failure test by the test unit during a test period in which the test unit performs the failure test,
the prohibiting unit prohibits the control unit from performing the eco-run control until the prohibiting unit determines that the failure test is completed,
the nullifying unit causes the prohibiting unit not to determine that the failure test is completed even when the failure test is completed, to nullify the failure test when it is detected that the power supply voltage supplied to the starter driving unit drops below the predetermined value during the test period,
the test unit operates a circuit constituting a part of the starter driving unit with a predetermined pattern in the test period, and
the nullifying unit nullifies the failure test when it is detected that the power supply voltage supplied to the starter driving unit drops below the predetermined value during the test unit operating the circuit with the predetermined pattern.

2. An eco-run control device, comprising:
a control unit configured to perform an eco-run control of stopping an engine on the basis of stop conditions and of restarting the engine on the basis of restart conditions,
a starter driving unit configured to drive a starter for restarting the engine;
a test unit configured to perform a failure test of the starter driving unit to determine whether the starter driving unit is out of order before the control unit stops the engine by the eco-run control;
a nullifying unit configured to nullify the failure test by the test unit when it is detected that a power supply voltage supplied to the starter driving unit drops below a predetermined value; and
a prohibiting unit configured to prohibit the control unit from performing the eco-run control when the test unit determines that the starter driving unit is out of order, wherein
the prohibiting unit prohibits the control unit from performing the eco-run control in a case where the nullifying unit nullifies the failure test by the test unit during a test period in which the test unit performs the failure test,
the prohibiting unit prohibits the control unit from performing the eco-run control until the test unit completes the failure test,
the nullifying unit causes the test unit not to perform the failure test, to nullify the failure test when it is detected that the power supply voltage supplied to the starter driving unit drops below the predetermined value during the test period,
the test unit operates a circuit constituting a part of the starter driving unit with a predetermined pattern in the test period, and
the nullifying unit nullifies the failure test when it is detected that the power supply voltage supplied to the starter driving unit drops below the predetermined value during the test unit operating the circuit with the predetermined pattern.

\* \* \* \* \*